(12) United States Patent
Miller et al.

(10) Patent No.: US 10,096,875 B2
(45) Date of Patent: Oct. 9, 2018

(54) SYSTEM AND METHOD FOR INCREASING ELECTRICAL EFFICIENCY OF METAL-AIR CELL

(71) Applicant: PHINERGY LTD., Lod (IL)

(72) Inventors: Yisrael Miller, Bat Ayin (IL); Avraham Yadgar, Kiryat Ono (IL); Dekel Tzidon, Hod Hasharon (IL)

(73) Assignee: PHINERGY LTD., Lod (IL)

( * ) Notice: Subject to any disclaimer, the term of this patent is extended or adjusted under 35 U.S.C. 154(b) by 0 days.

(21) Appl. No.: 14/779,753

(22) PCT Filed: Mar. 25, 2014

(86) PCT No.: PCT/IL2014/050320
§ 371 (c)(1),
(2) Date: Sep. 24, 2015

(87) PCT Pub. No.: WO2014/155383
PCT Pub. Date: Oct. 2, 2014

(65) Prior Publication Data
US 2016/0079642 A1    Mar. 17, 2016

Related U.S. Application Data

(60) Provisional application No. 61/804,867, filed on Mar. 25, 2013.

(51) Int. Cl.
*H01M 4/36* (2006.01)
*H01M 12/08* (2006.01)
(Continued)

(52) U.S. Cl.
CPC ............. *H01M 12/08* (2013.01); *H01M 2/40* (2013.01); *H01M 8/083* (2013.01);
(Continued)

(58) Field of Classification Search
CPC .... H01M 12/08; H01M 12/065; H01M 8/083; H01M 2/40; H01M 2300/0014
See application file for complete search history.

(56) References Cited

U.S. PATENT DOCUMENTS

| 3,666,561 A | 5/1972 | Chiku |
| 4,049,878 A | 9/1977 | Lindstrom |

(Continued)

FOREIGN PATENT DOCUMENTS

| CN | 1647296 | 7/2005 |
| GB | 1417727 | 12/1975 |

(Continued)

OTHER PUBLICATIONS

International Search Report of Application No. PCT/IL2014/050320 dated Jul. 3, 2014.

(Continued)

*Primary Examiner* — Jane Rhee
(74) *Attorney, Agent, or Firm* — Pearl Cohen Zedek Latzer Baratz LLP

(57) ABSTRACT

Flow directing element in a metal air cell is configured to cause evenly distributed flow of aqueous electrolyte solution electrolyte in it over the anode. Flow distributing element in a metal air cell is configured to lengthen the path of electrolyte flow from an inlet to the anode, thereby to increase ohmic resistance to shunt currents in the cell. A battery with these cells consumes the metal in the metal anodes evenly and with minimized shunt currents.

20 Claims, 4 Drawing Sheets

(51) Int. Cl.
*H01M 2/40* (2006.01)
*H01M 8/083* (2016.01)
*H01M 12/06* (2006.01)
(52) U.S. Cl.
CPC .. *H01M 12/065* (2013.01); *H01M 2300/0014* (2013.01); *Y02E 60/128* (2013.01)

(56) References Cited

U.S. PATENT DOCUMENTS

| | | |
|---|---|---|
| 4,842,963 A | 6/1989 | Ross |
| 4,894,294 A | 1/1990 | Ashizawa et al. |
| 4,908,281 A | 3/1990 | O'Callaghan |
| 5,147,736 A | 9/1992 | Lapp |
| 2012/0202127 A1 | 8/2012 | Friesen et al. |

FOREIGN PATENT DOCUMENTS

| | | |
|---|---|---|
| JP | 4938897 | 9/1998 |
| JP | 2013507741 | 3/2013 |

OTHER PUBLICATIONS

Office Action of Japanese Application No. 2016-504851 dated Oct. 3, 2017.
Office Action of Chinese Application No. 2014800291185 dated Jun. 14, 2018.

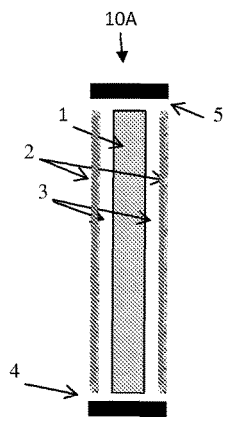
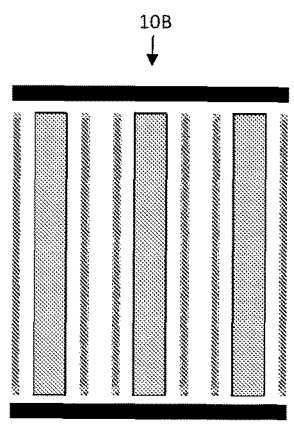
Fig. 1A            Fig. 1B
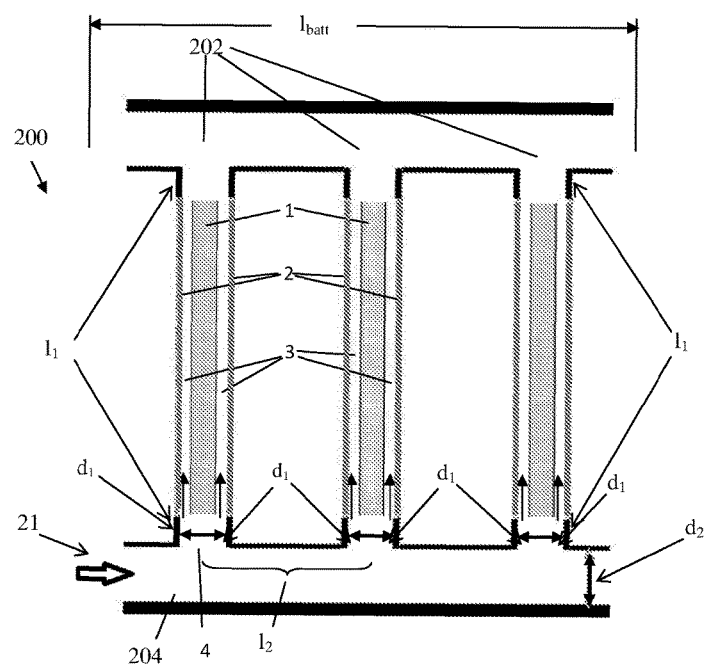
Fig. 2

SYSTEM AND METHOD FOR INCREASING ELECTRICAL EFFICIENCY OF METAL-AIR CELL

CROSS-REFERENCE TO RELATED APPLICATIONS

This application is a National Phase Application of PCT International Application No. PCT/IL2014/050320, International Filing Date Mar. 25, 2014, entitled SYSTEM AND METHOD FOR INCREASING ELECTRICAL EFFICIENCY OF METAL-AIR CELL published on Oct. 2, 2014 as International Publication No. WO 2014/155383 claiming priority of U.S. Provisional Patent Application No. 61/804, 867, filed Mar. 25, 2013, which is hereby incorporated by reference.

BACKGROUND

Electricity production by metal-air batteries is based on the oxidation of metals, usually aluminum, in the presence of air ($O_2$) and water. Aluminum reacts with oxygen and water to produce aluminum-hydroxide according to the following reaction:

$$4Al + 6H_2O + 3O_2 \rightarrow 4Al(OH)_3 + 2.71v \quad (1)$$

However, most of the aluminum-air cells work in a lower voltage than 2.71 volts, typically 0.7 to 1.5 volts, while the rest of the energy is released/dissipated as heat.

Apart of the electricity production chemical reaction, an additional corrosion reaction may take place in the metal-air battery/cell. Some of the aluminum may react with the water to produce aluminum-hydroxide and hydrogen according to the following reaction:

$$2Al + 6H_2O \rightarrow 2Al(OH)_3 + 3H_2 \quad (2)$$

Both the above reactions take place on the surface of the anode, thus may coat the anode with undesired $Al(OH)_3$ that does not dissolve in water. The building of an $Al(OH)_3$ coating may result in a decrease in the reaction rate and electricity production rate. In order to overcome this deficiency, aluminum-air cells contain alkaline electrolyte in an aqueous solution, such as KOH or NaOH, and an additional reaction that takes place as follows:

$$Al(OH)3 + KOH \rightarrow K^+ + Al(OH)-4 \quad (3)$$

The salt $K^+ + Al(OH)-4$ dissolves in water. This reaction allows removal of the $Al(OH)_3$ from the surface of the anode and continuous operation of the cell.

For reaction (3) to effectively remove the Al(OH)3 from the surface of the anode(s) a constant flow of aqueous alkaline solution must reach the anode(s) surfaces. When a plurality of anodes is used and/or the anode has large surface, the constant flow of aqueous alkaline solution may affect the rate of reaction (1) and the rate and efficiency of the electricity production.

The specific energy of an aluminum-air battery is defined as the amount of energy that can be extracted from the cells, divided by the total amount of energy that exists in the aluminum included in the cell. For a given aluminum-air battery/cell, its specific energy may be improved by improving the utilization of the aluminum fuel, for example, by forming substantially constant, and preferably equal flow of the aqueous solution near the anode(s).

SUMMARY OF THE INVENTION

A metal-air cell is disclosed comprising, according to embodiments of the present invention. a metal anode, an air electrode, an aqueous electrolyte solution inlet located at a first wall of the metal air cell, an aqueous electrolyte solution outlet located at a second wall opposite to the first wall, wherein the first and second walls have a first length and one or more slotted elements for directing flow of the aqueous electrolyte solution over a surface of the anode, that includes a plurality of slits to direct the flow of the aqueous electrolyte solution over a surface of the metal anode, the slotted element is positioned adjacent to the metal anode.

According to embodiments of the present invention all the slits have substantially the same cross section area and further all the slits force substantially even distribution of the electrolyte flow over a surface of the metal anode.

According to some embodiments of the present invention a metal air cell is disclosed comprising a metal anode, an air electrode, an aqueous electrolyte solution inlet located at a first wall of the metal air cell, an aqueous electrolyte solution outlet located at a second wall opposite to the first wall, wherein the first and second walls have a first length and one or more flow distributing elements for directing flow of the aqueous electrolyte solution over a surface of the anode, wherein the one or more flow distributing elements is designed to cause an extension of the length of flow path from the inlet to the metal anode by at least 1.5 times the first length.

According to some embodiments the at least one flow distributing element is configured to distribute the flow of aqueous electrolyte solution for splitting the flow of the aqueous electrolyte solution into at least two flow streams or joining two or more flow streams into a single flow and further the one or more flow distributing elements are positioned perpendicular to the direction of flow of the aqueous electrolyte solution over the surface of the anode and have a longitudinal dimension of at least 20% from the first length, the longitudinal dimension is substantially parallel to the first and second walls.

According to some embodiments a metal air battery is disclosed comprising two or more cells having substantially the same dimensions, each of the cells comprises a metal anode, at least one air electrode located in the vicinity of the metal anode, a first aqueous electrolyte solution inlet for introducing aqueous electrolyte solution to the cell, having a first cross section and a second aqueous electrolyte solution inlet for supplying the aqueous electrolyte solution to the two or more cells via the first aqueous electrolyte solution inlet, wherein a resistance to the flow in each cell is substantially the same. According to embodiments in the metal air battery the ratio between the first cross section and the second cross section is less than 0.8. According to some embodiments in the battery the first aqueous electrolyte solution inlet and the second aqueous electrolyte solution inlet force substantially even distribution of the electrolyte flow between the cells.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1B are schematic illustrations of exemplary metal-air cells according to some embodiments of the invention;

FIG. 2 is an illustration of an exemplary metal-air battery according to some embodiments of the invention;

DETAILED DESCRIPTION

Figure 3:
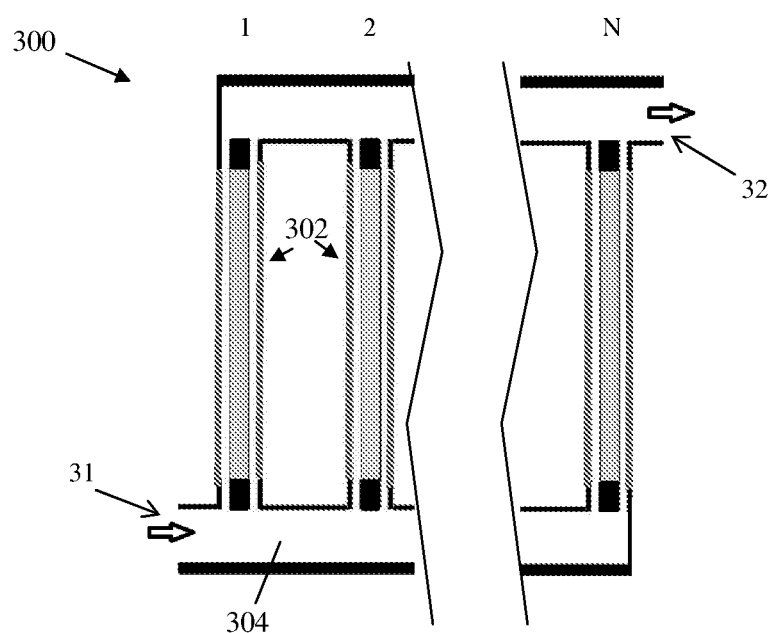
FIG. 3 is an illustration of an exemplary metal-air battery according to some embodiments of the invention.

Some embodiments of the present invention may relate to improved structures of the metal-air cells and batteries. The improved structures may increase the energetic efficiency of metal-air cells by preventing and optionally eliminating energy losses which stem from increased corrosion, undesired electrical interaction between the cells and uneven consumption of the anodes in the cell during its operation.

Referring now to FIG. 1A and FIG. 1B, which are schematic illustrations of metal-air cells 10A, 10B respectively, according to some embodiments of the present invention. The lines representing anode 1, cathodes (air electrodes) 2 and gaps 3 are schematic and may represent real 3D elements, for example plates that are perpendicular to the plane of the drawing and the gaps between them. Cells 10A and 10B may be included in metal-air battery. FIG. 1A presents cell 10A that may include a metal anode 1 at least one air electrode 2 and an aqueous electrolyte solution inlet 4. An exemplary metal anode 1, may be or may include, an aluminum anode, a zinc anode or the like.

Air electrode 2 may be located in the vicinity of metal anode 1 such that a gap 3 may be formed between air electrode 2 and the metal anode 1. During the activation of the cell gaps 3 between anode 1 and the air electrodes 2 may be filled with alkaline aqueous electrolyte solution. The aqueous electrolyte solution may enter the cell via inlet 4 and may exit the cell via an outlet 5. In Addition to removing the products of reactions (1) and (2) the aqueous electrolyte solution may supply the water for reactions (1) and (2) and further may participate in removing heat from anode 1.

FIG. 1B illustrates a cell that may include two or more anodes 1 having substantially the same dimensions, forming a series of cells, such as cell 10A. The cells may be eclectically connected to each-other. The cells, illustrated as substantially parallel to each other on a common plane, are given as an example only, and the present invention is not limited to a particular arrangement of cells and/or anodes in a cell (i.e., a battery). For example, the anodes may be arranged in a circle, in a square or in a triangle arrangement, substantially parallel to each other, forming a cylindrical (a rectangular or a prismatic) battery. In some embodiments, the abodes may not be parallel to each other.

In some embodiments, the dimensions of cell 10B or 10A, anodes 1, air electrode 2 and gaps 3 may affect the flow distribution of the electrolyte in the cell. FIG. 2 is a detailed schematic illustration of a metal-air battery according to some embodiments of the invention. A metal air battery 200 may include two or more cells 202 and second aqueous electrolyte solution inlet 21. Each of cells 202 may include a metal anode 1, at least one air electrode 2 and a first aqueous electrolyte solution inlet 4. Air electrode 2 may be located in the vicinity of metal anode 2 such that a gap 3 may be formed between air electrode 2 and metal anode 2. First aqueous electrolyte solution inlet 4 may have a first cross section area $d_1$. Second aqueous electrolyte solution inlet 21 may supply aqueous electrolyte solution 204 to the two or more cells 202 via first aqueous electrolyte solution inlet 4. The aqueous electrolyte solution 204 may flow from inlet 4 to gaps 3 between anodes 1 and air electrodes 2.

Second aqueous electrolyte solution inlet 21 may have a cross section area $d_2$ measured perpendicular to the direction of flow of aqueous electrolyte solution 204 in inlet 21. The dimensions of $d_1$ and $d_2$ may be determined such that a resistance to the flow in each cell may be substantially the same. The length of anodes 1 may be $l_1$, the distance between two consecutive anodes may be $l_2$ and the total length of the battery may be $l_{batt}$. The length of anodes l, the distance between two consecutive anodes, the total length of the battery and first and second cross section may be determined such that a constant and even flow through each of cells 202 and battery 200 may be kept. Furthermore, the drag (e.g., resistance to fluid flow) of the cell's fluid passages to the flow of the aqueous electrolyte solution may be substantially constant along the cell.

A drag imposed on the flow may be inversely related to the size of the cross-section area of the respective flow passage, and directly related to the length of that passage. In some embodiments, the ratio between the first cross section and the second cross section $d_1/d_2$ may be less than 0.8. Having a small $d_1/d_2$ ratio may cause the effect of the cross section area $d_2$ of inlet 21 on the flow at each cell 202 be negligible compared to the drag generated by flow through each inlet 4. The flow may be therefore practically determined by the cross-section area $d_1$ of inlet 4, and since all the passages of inlet 4 have substantially the same cross-section area and same length, the flows through the cells may be substantially equal.

The ohmic resistance to electrical current in a cell or on a battery is generally directly proportional to the length of the electrical current path and inversely proportional to the cross section area of that path. The ohmic resistance R1 through a first cell 202 of a plurality of cells included in battery 200 may be proportional to the dimensions of the passages in which the electrolyte flows. The ohmic resistance R1 may be proportional to the following equation:

$$R_1 = (l_1 + l_{batt})/d_1 \qquad \text{I.}$$

The ohmic resistance to electrical current in a second cell 202 from the plurality of cells included in battery 200 may be proportional to the following equation:

$$R_2 = (l_1 + l_{batt})/d_1 + l_2/d_2 \qquad \text{II.}$$

For example, when $d_1 = 40$ mm$^2$, $d_2 = 200$ mm$^2$, the cell length $l_{batt} = 160$ mm, $l_1 = 180$ mm and $l_2 = 20$ mm. Both $R_1$ and $R_2$ are approximately 13, thus the ohmic resistance and the aqueous solution flow rates in both cells are approximately the same.

Reference is now made to FIG. 3 that is a diagrammatic representation of a metal-air battery 300, according to some embodiments of the invention. Metal-air battery 300 may include N cells 302. Each of cells 302 may include substantially the same components and may have substantially the same physical dimensions as cell 202 illustrated in FIG. 2 and discussed above. An aqueous electrolyte solution 304 may enter battery 300 via second aqueous electrolyte solution inlet 31 and may exit battery 300 via aqueous electrolyte solution outlet 32. In such an arrangement, the ohmic resistance through the i-th cell (1≤i≤N) may be proportional to:

$$R_i = (i-1) \times (l_2/d_2) + (l_1 + l_{batt} + l_1)/d_1 + (n-i) \times (l_2/d_2) \qquad \text{III.}$$

Where $(i-1) \times (l_2/d_2)$ relates to the ohmic resistance of the passage located before cell i, and $(n-i) \times l_2/d_2$ relates to the ohmic resistance of the passage located after cell i. Therefore, for every cell i, the ohmic resistance through the cell may be proportional to the same value $(l_1 + l_{batt} + l_1)/d_1 + (n-1) \times l_2/d_2$, thus the electric flux through cells i may be substantially equal? throughout the cells.

In some embodiments, the even distribution of the aqueous electrolyte solution flow 304 between cells 302 may ensure uniformity of heat dissipation, $H_2$ removal, and removal of the products of reaction (1) and reaction (2). As a result, the voltage drop of one cell compared to the other cells in a battery such as battery 300 may be reduced, and the anodes in the cells may be consumed evenly, which may lead to higher utilization of the metal contained in battery 300. All the above may result in a higher energetic efficiency of the battery 300.

Figure 4:
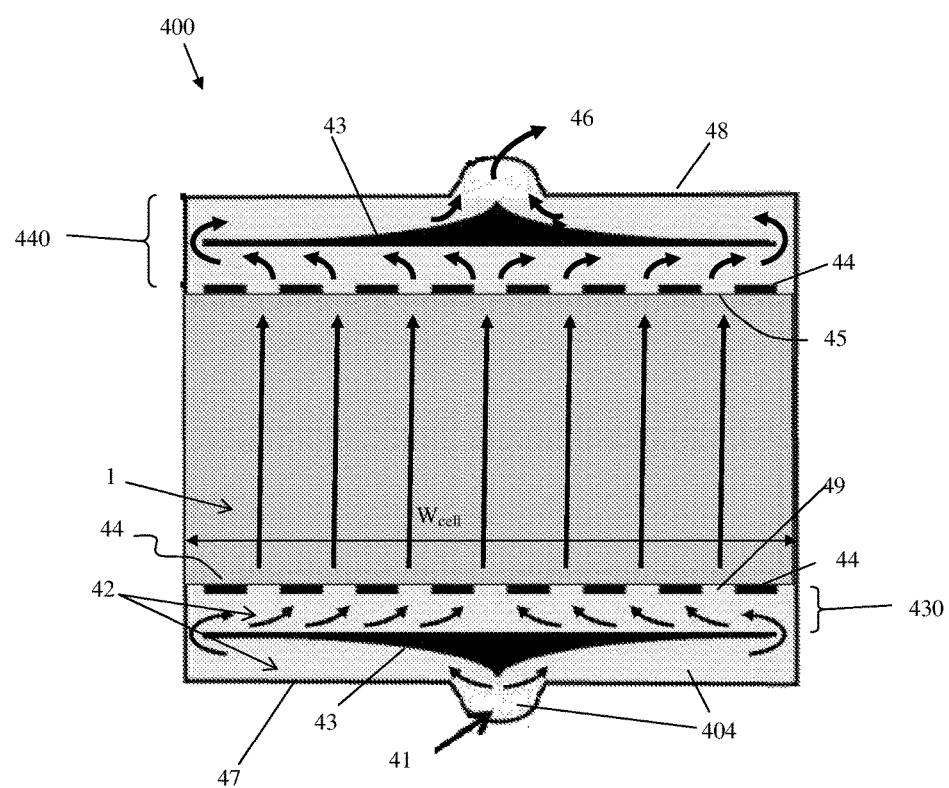
FIG. 4 is an illustration of an exemplary metal-air cell according to some embodiments of the invention.

Some aspects of the present invention may relate to directing the flow of the aqueous electrolyte solution over the surface of the anodes at each cell using various flow directing elements. FIG. 4 is an illustration of a metal-air cell, according to some embodiments of the present invention. Two or more metal-air cells 400 may be included in a metal air-battery, such as battery 200 or battery 300 according to some embodiments of the invention. A plurality of cells 400 may be included in the cell's farm.

A metal-air cell 400 may include a metal anode 1, an air electrode 2 (illustrated in FIG. 2), an aqueous electrolyte solution inlet 41, an aqueous electrolyte solution outlet 46 and one or more flow directing elements, for example, flow distributing element 43 and/or slotted element 44, for directing flow of an aqueous electrolyte solution 404 over a surface of metal anode 1. Metal anode 1 and air-electrode 2 may be substantially the same as metal anode 1 and air electrode 2 discussed above with respect to FIGS. 1 and 2.

Aqueous electrolyte solution 404 may enter cell 400 via aqueous electrolyte solution inlet 41 (that may be fed with aqueous electrolyte solution 404 via passages such as passage 21 of FIG. 2 or passage 31 of FIG. 3). Aqueous electrolyte solution inlet 41 may be located at a first wall 47 of the metal air cell. Solution 404 may flow through hydraulic passage 42 formed by the presence of flow distributing element 43 positioned in the way of aqueous electrolyte solution flow. Aqueous electrolyte solution 404 may exit cell 400 via aqueous electrolyte solution outlet 46. Aqueous electrolyte solution outlet 46 may be located at a second wall 48 opposite to first wall 47. First wall 47 and second wall 48 may have a first length equal to the width of cell 400 $W_{cell}$.

Cell 400 may include several flow distributing elements 43 that may impose substantial extension of the length of flow path of aqueous electrolyte solution 404 from solution inlet 41 to anode 1. Aqueous electrolyte solution 404 passage, from inlet 41 and along flow distributing element 43, may be designed to cause an extension of the length of flow path from the inlet to the metal anode by at least 1.5 times the first length $W_{cell}$. The longer is the flow passage of the electrolyte solution the larger is the ohmic resistance of the cell. This arrangement may ensure substantially even flow of aqueous electrolyte solution 404 over substantially the entire surface of anodes 1 and high ohmic resistance of aqueous electrolyte solution to shunt currents between anodes. The undesired effect of shunt currents is discussed below with respect to FIG. 5.

In some embodiments, one or more flow distributing elements 43 may be positioned perpendicular to the direction of flow of aqueous electrolyte solution 44 over the surface of metal anode 1. Flow distributing element 43 may have a longitudinal dimension of at least 20% of first length $W_{cell}$. The longitudinal dimension of distributing element 43 may be substantially parallel to first wall 47 and/or second wall 48. In some embodiments, one or more flow distributing elements 43 may be positioned in a first distance from at least one of first wall 47 and/or second wall 48.

At least one flow distributing element 43 may be positioned after inlet 41, enabling at least one flow distributing element 43 to at least partially block aqueous electrolyte solution flow from inlet 41 to metal anode 1. Aqueous electrolyte solution 404 may enter inlet 41 and face first flow distributing element 43 that may force the flow to slow down and split. Flow distributing element 43 may be configured to distribute the flow of aqueous electrolyte solution 404 for splitting the flow of the aqueous electrolyte solution into at least two flow streams or joining two or more flow streams into a single flow, as illustrated in FIG. 4. The at least two streams may flow along at least a portion of the longitudinal dimension, till the end of flow distributing element 43, crossing element 43 to reach anode 1. At least one flow distributing element 43 may be positioned substantially symmetrically with respect to inlet 46. Additionally or alternatively, flow distributing element 43 may be positions at any location between inlet 41 and metal anode 1.

In some embodiments, at least one flow distributing element 43 may be positioned between anode 1 and outlet 46 enabling at least one flow distributing element 43 to at least partially interfere with direct flow of aqueous electrolyte solution 404 from metal anode 1 to the outlet 46. At least one flow distributing element 43 may be positioned substantially symmetrically with respect to the outlet and extending in a direction substantially perpendicular to the direction of the aqueous electrolyte solution flow over anode 1. Additionally or alternatively, flow distributing element 43 may be positions at any location between outlet 46 and metal anode 1.

In some embodiments, cell 400 may include one or more slotted elements 44 for directing the electrolyte flow over the surface of anode 1. At least one slotted element 44 may include a plurality of slits 49 to direct the flow of the aqueous electrolyte solution over a surface of the metal anode. The slotted element may be positioned adjacent to the metal anode. According to some embodiments of the invention, all slits 49 may have substantially the same cross section area. Slits 49 may be designed to force substantially even distribution of the electrolyte flow over the surface of metal anode 1.

In some embodiments, each of slits 49 may have a cross section A. A ratio between a cross section A of each of slits 49 and a cross section of an element providing the aqueous electrolyte solution to the metal-air cell may be determined to cause substantially even distribution of the electrolyte flow over a surface of metal anode 1. In some embodiments, the ratio may be less than 0.8. In some embodiments, a cross section 440 of the element providing the aqueous electrolyte solution to the metal-air cell may determined between the metal electrode and the first wall 57 or second wall 58 adjacent to it. In some embodiments, the cross section 430 of the element providing the aqueous electrolyte solution may determined between the metal electrode and flow distributing element 43.

Cross section A may be substantially smaller than the cross section of the element providing the aqueous electrolyte solution to the metal-air cell. For example, the cross section of the element providing the aqueous electrolyte solution to the metal-air cell may be determined based on the distance between the metal electrode and the first wall 57 or second wall 58 adjacent to it or the distance between the metal electrode and flow distributing element 43 and the height of cell 400 (not illustrated). The cross section of each slit 49 may be determined based on the width of each slit (as illustrated) and the height of each slit (not illustrated). The height of each slit may be substantially smaller than the height of cell 400 and the width of slit 49 may be substantially smaller than distances 430 and 440.

Shunt currents may be defined as currents developing through aqueous electrolyte solution in a cell, due to difference in the momentary voltage between different cells/subcells. In some embodiments, in order to reduce shunt currents between neighboring cells (such as cells $302_1$, $302_2$, etc.), the length of the flow path may be extended on purpose to increase the ohmic resistance of the respective electrical path to shunt currents, by including specially designed structure elements used as flow directing elements, that may force aqueous electrolyte solution 404 flow path (for example from entry 41 to outlet 46) and over an anode), to be at least 1.5 times longer than the length of the cell.

Figure 5:
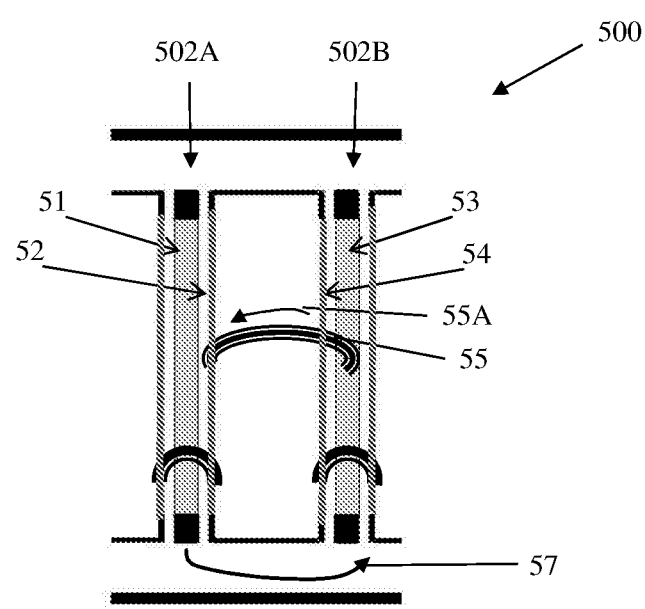
FIG. 5 is an illustration of shunt currents in a metal-air battery according to some embodiments of the invention It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

The effect of a shunt current is better understood with respect to FIG. 5 and the accompanying text, which schematically presents partial view of battery 500. Battery 500 may include at least one flow distributing element 43 as illustrated in FIG. 4. Due to the presence of flow distributing element 43 the flow enters from inlet 41 splits into two streams flowing in hydraulic passage 42, in such way as to extend the length the flow path thus to increase the electrical resistance of the aqueous electrolyte solution along that flow path. The result may by that cathodes and anodes in adjacent cells, which are electrically connected through the electrolyte and differ from each other by their relative voltage, are hydraulically far from each other, and the ohnic resistance of the electrolyte over the electrolyte flow distance may be enough to reduce the shunt current between the cells to negligible currents. The flow distributor of element 43 may also block the aqueous electrolyte solution from flowing directly from inlet 41 and over anode 1, thus causing a uniform flow of the aqueous electrolyte solution, as discussed above.

Slotted element 44 may cause even flow and even distribution of the aqueous electrolyte solution over the surface of anode 1. Cell 400 may include at least one slotted element 44. Since all of the slits 49 may have substantially the same area, the flow resistance imposed by each slit may be substantially the same. In some embodiments the ratio between the area of the slit 49 and the areas of the cross section of hydraulic passage 42 may be such that the influence on the ohmic resistance imposed by the passage dimensions (e.g., cross section area 440 between a cell wall and the anode or cross section area 430 between flow distributing element 43 and the anode) may be negligible compared with the influence of the narrow slits 49. When slotted element 44 includes a plurality of slits 49, the influence on the ohmic resistance may be determined by the area of each stilts. When the slits have substantially the same area the ohmic resistance by each slit may be substantially the same.

In some embodiments, cell 400 may include two slotted elements 44 and two flow distributing elements 43, one on each side of anode 1, as illustrated in FIG. 4. The aqueous electrolyte solution may enter from inlet 41, split into two sub-streams 42 by flow distributing elements 43 and flow over the surface of anode 1 via slits 49. The aqueous electrolyte solution may exit the surface of anode 1 via slits 49 at the other side of the anode, split into two sub-streams and exit the cell via outlet 46. The result may be an even flow of the aqueous electrolyte solution on the surface of anode 1 such that, reaction (3) happens uniformly throughout the surface of the anode, therefore the entire anode may be evenly and extensively cleaned from the products of reaction (1) and reaction (2). This may lead to higher utilization of the anode's surface area, and therefore may result in higher voltage, which implies higher energetic utilization of the metal in the cell.

In a numeric exemplary embodiment, a battery may include a plurality of cells (e.g., cell 202, 302 or 400) each having a width of $W_{cell}$=160 mm. The distance between two neighboring cells is $W_1$=20 mm. When considering two neighboring cells, the electrical resistance of the electrolyte between the cells, if a simple cell is used, is linearly proportional to D1=20 mm, for example the cell illustrated in FIG. 1. When a cell according to embodiments of the present invention, for example, the cell illustrated in FIG. 4, is used, the electrical resistance of the electrolyte between the cells is linearly proportional to $1.5 \times W_{cell} + W_1 + 1.5 \times W_{cell}$=500 mm.

In some metal air batteries, according to the invention, the cell's voltage may be between 0.7 v and 1.5 v. Reference is now made to FIG. 5 that presents an illustration of typical shunt current paths in battery 500 comprising at least two cells 500A and 500B. Battery 500 may include an anode 51 and an air electrode 52 included in cell 500A and an anode 53 and an air electrode 54 included in cell 500B. The voltage at cell 500A between anode 51 and a cathode (air electrode) 52 may be V1 (e.g., 1.2 volts). Similarly the voltage at cell 500B between anode 53 and a cathode (air electrode) 54 may be V2 (e.g., 1.2 volts). Air electrode 52 may be electrically connected to anode 53 via contact 55 (series connection of cells) therefore, the voltage between anode 51 and air electrode 54 may be V1+V2 (e.g., 2.4 volts). However, all the cells share the same aqueous electrolyte solution, thus are in an 'electrical short' between them, through the electrolyte. The current created between the cells via the aqueous electrolyte solution is referred herein as "shunt current", schematically illustrated in FIG. 5 as current 57. Current 57 may be subtracted from a usable current 55A produced by the battery. The result may be that some of the energy of the cells may be consumed by the shunt currents, rather than being delivered at the electrical output of the battery. Another possible side effect may be decomposition of water, which results, in addition to the energetic loss, evolution of $O_2$ and $H_2$. Using a cell structure according to some embodiments of the invention, may reduce the amount of shunt currents in the battery thus remedy the side effect of decomposition of the water.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A metal-air cell comprising:
   an air electrode;
   an aqueous electrolyte solution inlet located at a first wall of the metal air cell;

an aqueous electrolyte solution outlet located at a second wall opposite to the first wall, wherein the first and second walls have a first length;

a metal anode disposed between the first wall and the second wall, whereby a flow path of the aqueous electrolyte solution is from the inlet to the outlet over a surface of the metal anode;

at least one flow distributing element positioned immediately after the inlet perpendicular to a direction of flow of the aqueous electrolyte solution, wherein the at least one flow of the aqueous electrolyte arrives from the inlet, through an hydraulic passage formed by the presence of the flow distributing element and over the surface of the anode, wherein a longitudinal dimension of the at least one flow distributing element is parallel to the first wall or to the second wall; and at least one slotted element for directing flow of the aqueous electrolyte solution over a surface of the anode, that includes a plurality of slits to direct the flow of the aqueous electrolyte solution over the surface of the metal anode, wherein the slotted element is positioned adjacent to the metal anode.

2. The metal-air cell of claim 1, wherein all the slits have substantially the same cross section area.

3. A metal-air cell according to claim 2, wherein all the slits force substantially even distribution of the electrolyte flow over the surface of the metal anode.

4. A metal-air battery according to claim 1, wherein the longitudinal dimension of the at least one flow distributing element is at least 20% of the first length, and the longitudinal dimension is substantially parallel to the first and second walls.

5. The metal-air cell according to claim 4, wherein the at least one flow distributing element is positioned between the inlet and the anode, enabling the at least one flow distributing element to partially block/interfere with an aqueous electrolyte solution flow from the inlet to the metal anode.

6. The metal-air cell according to claim 4, wherein the at least one flow distributing element is positioned between the anode and the outlet, enabling the at least one flow distributing element to partially interfere with direct flow of aqueous electrolyte solution from the metal anode to the outlet.

7. A metal-air cell according to claim 5, wherein at least one flow distributing element extends substantially symmetrically with respect to the inlet.

8. A metal-air cell according to claim 6, wherein at least one flow distributing element extends substantially symmetrically with respect to the outlet and in a direction substantially perpendicular to the direction of flow over the anode.

9. A metal-air cell according to claim 2, wherein a ratio between a cross section of each of the slits and a cross section of an element providing the aqueous electrolyte solution to the metal-air cell is determined to cause substantially even distribution of the electrolyte flow over the surface of the metal anode.

10. A metal-air cell according to claim 9, wherein the ratio is less than 0.8.

11. A metal-air cell according to claim 9, wherein the cross section of the element providing the aqueous electrolyte solution to the metal-air cell is determined between the metal electrode and the first or second wall adjacent to it.

12. A metal-air cell according to claim 9, wherein the cross section of the element providing the aqueous electrolyte solution is determined between the metal electrode and the flow distributing element.

13. A metal air cell comprising:

an air electrode;

an aqueous electrolyte solution inlet located at a first wall of the metal air cell;

an aqueous electrolyte solution outlet located at a second wall opposite to the first wall, wherein the first and second walls have a first length;

a metal anode disposed between the first wall and the second wall, whereby a flow path of the aqueous electrolyte solution is from the inlet to the outlet over a surface of the metal anode; and at least one flow distributing element positioned immediately after the inlet perpendicular to a direction of flow of the aqueous electrolyte solution, wherein the at least one flow of the aqueous electrolyte arrives from the inlet, through an hydraulic passage formed by the presence of the flow distributing element and over the surface of the anode, wherein a longitudinal dimension of the at least one flow distributing element is parallel to the first wall or to the second wall, and wherein the at least one flow distributing element is designed to cause an extension of the length of flow path from the inlet to the metal anode by at least 1.5 times the first length.

14. A metal-air cell according to claim 13, wherein the at least one flow distributing element is configured to distribute the flow of aqueous electrolyte solution for splitting the flow of the aqueous electrolyte solution into at least two flow streams or joining two or more flow streams into a single flow.

15. A metal-air cell according to claim 13, wherein the longitudinal dimension of the at least one flow distributing element is at least 20% from the first length, and the longitudinal dimension is substantially parallel to the first and second walls.

16. A metal-air cell according to claim 13, wherein the at least one flow distributing element is positioned, within the flow path, after the inlet, thereby enabling the at least one flow distributing element to at least partially block an aqueous electrolyte solution flow from the inlet to the metal anode.

17. A metal-air cell according to claim 13, wherein the at least one flow distributing element is positioned, within the flow path, between the anode and the outlet, thereby enabling the at least one flow distributing element to at least partially interfere with direct flow of aqueous electrolyte solution from the metal anode to the outlet.

18. A metal-air battery comprising:

two or more cells having substantially the same dimensions, an aqueous electrolyte solution passage for introducing aqueous electrolyte solution to the two or more cells, wherein each of the cells comprises:

an aqueous electrolyte solution inlet located at a first wall of the cell;

an aqueous electrolyte solution outlet located at a second wall opposite to the first wall, wherein the first and second walls have a first length;

a metal anode disposed between the first wall and the second wall, whereby a flow path of the aqueous electrolyte solution is from the inlet to the outlet over a surface of the metal anode;

at least one air electrode located in the vicinity of the metal anode;

one or more flow distributing elements positioned immediately after the inlet perpendicular to the direction of flow of the aqueous electrolyte solution, wherein the at least one flow of the aqueous electrolyte arrives from the inlet, through an hydraulic passage formed by the presence of the flow distributing element and over the surface of the anode, wherein a longitudinal dimension of each of the one or more flow distributing elements is parallel to the first wall or to the second wall, and wherein a resistance to the flow in each cell is substantially the same; and at least one slotted element for directing flow of the aqueous electrolyte solution over a surface of the anode, that includes a plurality of slits to direct the flow of the aqueous electrolyte solution over the surface of the metal anode, wherein the slotted element is positioned adjacent to the metal anode.

19. A metal-air battery according to claim 18, wherein a ratio between a cross section of the aqueous electrolyte solution inlet and a cross section of the aqueous electrolyte solution passage is less than 0.8.

20. A metal air battery according to claim 18, wherein the aqueous electrolyte solution inlet and the aqueous electrolyte solution passage force substantially even distribution of the electrolyte flow between the cells.

\* \* \* \* \*